US005138461A

United States Patent [19]

Kawamura et al.

[11] Patent Number: 5,138,461

[45] Date of Patent: Aug. 11, 1992

[54] IMPLOSION-PROTECTED CATHODE-RAY TUBE

[75] Inventors: Takao Kawamura, Chiba; Masaharu Kumada, Mobara; Hiroshi Kawasaki, Sanbu, all of Japan

[73] Assignees: Hitachi Ltd., Tokyo; Hitachi Device Engineering Co., Ltd., Chiba, both of Japan

[21] Appl. No.: 451,793

[22] Filed: Dec. 18, 1989

[30] Foreign Application Priority Data

Dec. 21, 1988 [JP] Japan ............................... 63-320656

[51] Int. Cl.[5] ............................................. H04N 5/65

[52] U.S. Cl. .................................... 358/246; 358/245; 220/2.1 A; 220/2.3 A

[58] Field of Search ............................... 358/245, 246; 220/2.1 A, 2.3 A; 328/8

[56] References Cited

FOREIGN PATENT DOCUMENTS 0061550 4/1983 Japan .................................. 358/246

*Primary Examiner*—Jin F. Ng
*Assistant Examiner*—Dov Popovici
*Attorney, Agent, or Firm*—Antonelli, Terry, Stout & Kraus

[57] ABSTRACT

An implosion-protected cathode-ray tube has a bulb and a metallic band tightly binding the front outer peripheral portion of the bulb to suppress the occurrence of accidental implosion of the bulb during the manufacturing processes including a heating and evacuation process and a rapid cooling process after the heating and evacuation process as well as after the manufacture of the cathode-ray tube. The material forming the metallic band and the size of the metallic band meet the following conditions: i) the thermal expansion coefficient $\alpha_s$ of the material is not less than the thermal expansion coefficient $\alpha_g$ of the glass forming the bulb; ii) a value expressed by: $L(1+\alpha_s.\delta t)$, where L is the inner perimeter of the metallic band at the ambient temperature when the tightened metal band is removed from the bulb and where $\alpha t$ is the temperature differential between the ambient temperature and a temperature for a heating and evacuation process, is smaller than the perimeter of the front outer peripheral portion of the bulb on which the metallic band is shrunk, during the heating and evacuation process, and iii) a stress corresponding to the yield point of the material of the metallic band remains in the metallic band at the ambient temperature.

3 Claims, 1 Drawing Sheet

IMPLOSION-PROTECTED CATHODE-RAY TUBE

BACKGROUND OF THE INVENTION

The present invention relates to an implosion-protected cathode-ray tube comprising a bulb, and a metallic band tight binding a front outer peripheral portion of the bulb near the front face of the bulb, and designed for efficient mass production.

Because it is evacuated to a high vacuum and continuously subjected to a pressure corresponding to the atmospheric pressure, the cathode-ray tube can implode suddenly if the surface of the glass bulb is damaged or an impact is applied thereto resulting in a dangerous scattering of pieces of broken glass. Various means have been proposed and applied to the cathode-ray tube to prevent the implosion of the cathode-ray tube. A currently most prevalent means for avoiding the implosion of the cathode-ray tube and the resulting scattering of pieces of broken glass even when the airtightness of the bulb is broken employs a metallic band tightened around a largest outer peripheral portion of the bulb near the front face to bind the largest front portion tight so that stress induced in the bulb by the atmospheric pressure is relaxed and the propagation of cracks may be suppressed.

In most cases, the metallic band is tightened around the largest outer peripheral portion of the bulb after the heating and evacuation of the cathode-ray tube to prevent implosion. A stress is induced in the evacuated glass bulb by the pressure difference between the outside and inside of the glass bulb and by the sudden drop of the temperature of the glass bulb when the glass bulb is taken out after the heating and evacuation from a heating furnace heated at a temperature on the order of 400° C. Accordingly, there is a danger that the bulb can implode suddenly and pieces of broken glass can scatter in the heating and evacuation process including the process of taking out the bulb from the heating furnace, when the bulb has cracks or an impact is applied to the bulb. Recently, such a danger has progressively increased with the increasing use of large cathode-ray tubes having a nearly flat face. As stated in Japanese Patent Laid-Open No. 62-5533, even if a metallic band is tightened around the largest outer peripheral portion of a bulb prior to the heating and evacuation process, the metallic band provides a thermal expansion greater than that of the glass bulb in the heating furnace during the heating and evacuation process when any special consideration is not given, so that the metallic band is unable to exert its effect properly.

SUMMARY OF THE INVENTION

Accordingly, it is an object of the present invention to provide an implosion-protected cathode-ray tube solving the foregoing problems in the conventional cathode-ray tube, provided with a metallic band for protecting the glass bulb of the cathode-ray tube from implosion, and capable of effectively providing implosion prevention during the heating and evacuation process.

To achieve this object, the present invention provides an implosion-protected cathode-ray tube manufactured through the heating and evacuation of a bulb after tightening a metallic band around the largest outer peripheral portion of the bulb to protect the bulb from implosion, in which the thermal expansion coefficient $\alpha_s$ of the material of the metallic band is determined selectively so that the thermal expansion coefficient $\alpha_s$ of the material of the metallic band is not less than the thermal expansion coefficient $\alpha_g$ of the glass forming the bulb, and a value expressed by: $L(1+\alpha_s.\delta t)$, where L is the inner perimeter of the metallic band at the ambient temperature when the tightened metal band is removed from the bulb, and $\delta t$ is a temperature differential for the heating and evacuation process, namely, the difference between the ambient temperature and a temperature for the heating and evacuation, is smaller than the perimeter of the largest outer peripheral portion of the bulb in the heating and evacuation process.

Before subjecting the bulb to the heating and evacuation process, a non-inflammable buffer member is wound round the largest outer peripheral portion of the bulb at the ambient temperature, and then the heated metallic band is shrunk on the largest outer peripheral portion of the bulb in a shrinkage fit so that a residual tensile stress in the metallic band at the ambient temperature corresponds to the yield point of the material of the metallic band.

DETAILED DESCRIPTION OF THE INVENTION

Figure 1:
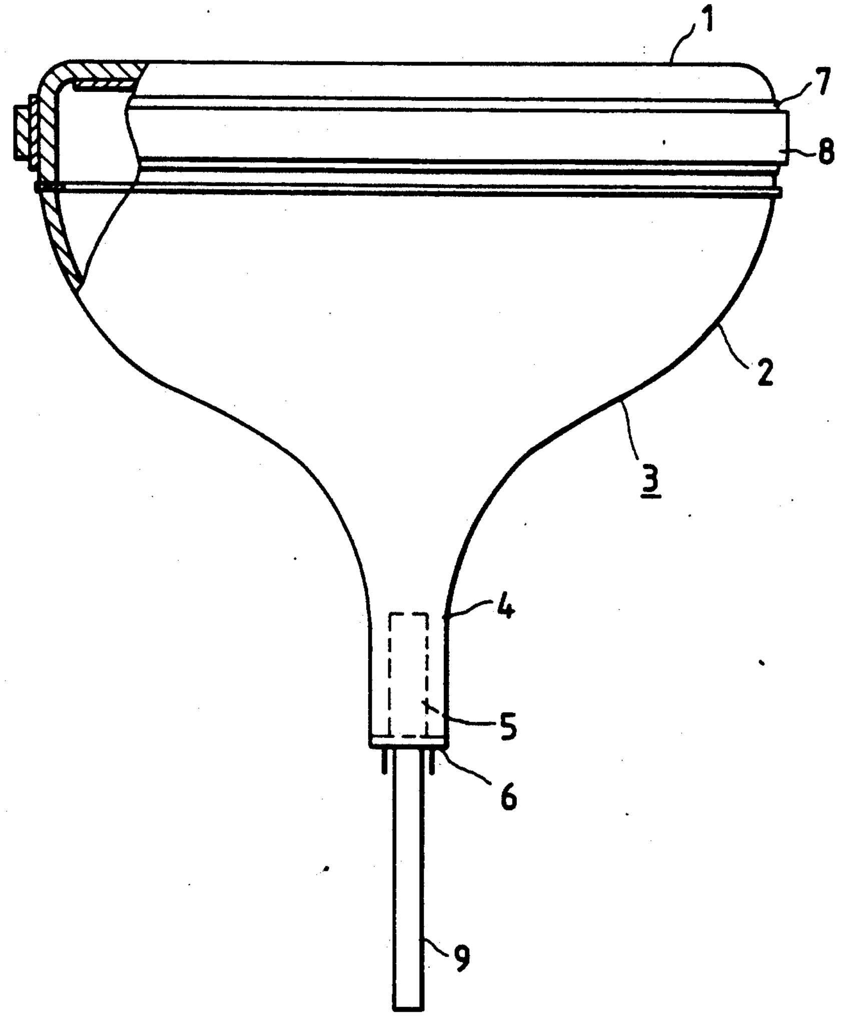
FIG. 1 is a partly sectional side elevation of an implosion-protected cathode-ray tube in an embodiment according to the present invention.

When the thermal expansion coefficient $\alpha_s$ of the material of the metallic band is smaller than the thermal expansion coefficient $\alpha_g$ of the glass forming the bulb, it is possible that the metallic band is subject to elongation beyond the yield point during the heating and evacuation process, so that the metallic band is unable to stay tight at a proper tensile stress around the largest outer peripheral portion of the bulb during a cooling process after the heating and evacuation process. On the contrary, when the thermal expansion coefficient of the material of the metallic band is not less than that of the glass forming the bulb, the metallic band is not subject to elongation beyond the yield point during the heating and evacuation process.

Furthermore, when the material of the metallic band is determined so that a value expressed by: $L(1+\alpha_s.\ \delta t)$, where L is the inner perimeter of the metallic band at the ambient temperature when the tightened metal band is removed from the bulb, and $\delta t$ is a temperature differential for the heating and evacuation process, is smaller than the perimeter of the largest outer peripheral portion of the bulb during the heating and evacuation process, the metallic band is kept tight round the largest front outer peripheral portion of the bulb during the heating and well evacuation process and never fall off the bulb.

The present invention will be described more quantitatively hereinafter using the following symbols.

DEFINITION OF SYMBOLS $L_B$: The perimeter of a largest front outer peripheral portion of a bulb, $L_i$: The inner perimeter of a metallic band before shrinkage fit process, L: The inner perimeter of the metallic band at the ambient temperature when the tightened metal band is removed from a bulb, $\epsilon_y$: Strain at the yield point of the metallic band before being put on the bulb, $\epsilon_{ya}$: Strain at the yield point of the metallic band after being put on the bulb, $\alpha_g$: The thermal expansion coefficient of the glass forming the bulb, $\alpha_s$: The thermal expansion coefficient of the material of the metallic band, $\delta t$: Temperature differential for heating and evacuation (the difference between the ambient temperature and a temperature for heating and evacuation process), $\delta t'$: Temperature differential for shrinkage fit (the difference between the ambient temperature and a temperature for the shrinkage fit process).

As stated above, since a residual stress in the metallic band at the ambient temperature after the metallic band has been shrunk on the bulb in the shrinkage fit corresponds to the yield point, the difference between $L_B$ and L corresponds to a strain at the yield point, that is, $$L_B = L(1+\epsilon_{ya}) \approx L(1+\epsilon_y)$$

$$L \approx L_b/(1+\epsilon_y) \ldots \quad (1)$$

The inner perimeter $L(1+\alpha_s.\delta t)$ of the metallic band at a temperature for heating and evacuation must be smaller than the perimeter $L_B(1+\alpha_g.\delta t)$ of the largest front outer peripheral portion of the bulb at the same temperature so that the metallic band cannot fall from the bulb, that is:

$$L(1+\alpha_s\delta t) < L_B(1+\alpha_g\delta t)$$

By substituting expression (1) into this expression, we obtain, $$\{L_B/(1+\epsilon_y)\}(1+\alpha_s\delta t) < L_B(1+\alpha_g\delta t)$$

$$\alpha_s < \{(1+\alpha_g\delta t)(1+\epsilon_y)-1)/\delta t$$

On the other hand, the thermal expansion coefficient $\alpha_s$ of the material of the metallic band must be not less than the thermal expansion coefficient $\alpha_g$ of the glass forming the bulb so that the metallic band does not elongate beyond the yield point during the heating and evacuation process, that is, $$\alpha_g \leqq \alpha_s$$

Therefore, the range of the thermal expansion coefficient $\alpha_s$ of the material of the metallic band must meet an inequality:

$$\alpha_g \leqq \alpha_s < \{1+\alpha_g\delta t)(1+\epsilon_y)-1\})/\delta t \quad (2)$$

Therefore, the material of the metallic band may be selected such that the thermal expansion coefficient $\alpha_s$ thereof and the strain $\epsilon_y$ at the yield point thereof satisfy the expression (2).

Incidentally, since the metallic band is shrunk on the largest front outer peripheral portion of the bulb in a shrinkage fit, $L_B$ is greater than $L_i$ and, since the metallic band is subject to elongation beyond the yield point in shrinking the metallic band on the bulb, the difference $L_B - L_i$ is greater than its strain $L_i.\epsilon_y$ at the yield point, that is, $$L_B - L_i > L_i.\epsilon_y \text{ hence}$$

$$L_i < L_B/(1+\epsilon_y) \quad (3)$$

To tighten the metallic band around the largest front outer peripheral portion of the bulb in a shrinkage fit, the inner perimeter $L_i(1+\alpha_s.\delta t')$ of the metallic band at the temperature for shrinkage fit process must be greater than the perimeter $L_B$ of the largest front outer peripheral portion of the bulb at the ambient temperature, that is, $$L_B < L_i(1+\alpha_s\delta t') \quad (4)$$

Therefore, the inner perimeter $L_i$ of the metallic band before the shrinkage fit process and the difference between the ambient temperature and the temperature for shrinkage fit process are determined so as to meet expressions (3) and (4) respectively.

The thermal expansion coefficient $\alpha_s$ and inner perimeter $L_i$ before shrinkage fit process of the metallic band employed in the present invention and the temperature differential $\delta t'$, i.e., the difference between a temperature for shrinkage fit process and the ambient temperature, are determined by the following procedure.

i) The thermal expansion coefficient $\alpha_g$ of the glass forming the bulb, and the temperature differential $\delta t$, i.e., the difference between a temperature for heating and evacuation process and the ambient temperature, are given. The values may be determined by a conventional technique.

ii) A material for forming the metallic band, having $\alpha_s$ and $\epsilon_y$ meeting expression (2) is selected.

iii) A value for the inner perimeter $L_i$ of the metallic band before the shrinkage fit process which meets expression (3) is determined.

iv) A value for the temperature differential $\delta t'$ between the temperature of the metallic band for shrinkage fit and the ambient temperature, i.e., a temperature increment for the shrinkage fit proess which meets expression (4) is determined.

v) If the values of $L_i$ and $\delta t'$ determined through the foregoing steps are inappropriate, the same steps are repeated for another material satisfying the expression (2) to determine an appropriate material for the metallic band.

vi) The metallic band is tested on the actual bulb to confirm the appropriateness of the values of $L_i$ and $\delta t'$ determined through the foregoing steps or to make the values of $L_i$ and $\delta t'$ appropriate by a cut-and-try method.

Since the non-inflammable buffer member has a very small thickness in the range of 0.01 to 0.1 mm, the thickness of the non-inflammable buffer member is neglected in the foregoing quantitative description.

When the non-inflammable buffer member is wound around the largest front outer peripheral portion of the bulb, and then the metallic band is shrunk on the largest front outer peripheral portion of the bulb in a shrinkage fit before the heating and evacuation process so that a stress corresponding to the yield point of the material of the metallic band remains within the metallic band when the metallic band is cooled to the ambient temperature after shrinkage fit, a variation in the perimeter of the largest front outer peripheral portion of the bulb or in the perimeter of the same with the noninflammable buffer member, if any, is absorbed by the elongation of the metallic band, and a fixed stress corresponding to the yield point of the material of the metallic band remains in the metallic band.

The non-inflammable buffer member is, for example, a glass cloth tape, a strip of aluminum foil or a strip of copper foil.

The thickness of the metallic band is, usually, in the range of 0.5 to 2.0 mm, which is a range for the thickness in the prior art. A thickness exceeding 2 mm is undesirable, because such a large thickness affects the workability of the metallic band adversely and increases the weight of the metallic band excessively.

Although the thermal expansion coefficient $\alpha_s$ of the material of the metallic band may be of any value in a range meeting expression (2), a preferable value in general is in the range of $10.4\times10^{-6}$ to $12.3\times10^{-6}$/° C. in view of conditions for the heating and evacuation process and the glass material of the bulb employed usually at present.

The temperature differential $\delta t$ for the heating and evacuation process can be in the range of 400° to 700° C., which is also a range for the conventional heating and evacuation.

Mild steels, which are materials forming the conventional metallic bands, are unsuitable. Materials having values thermal expansion coefficient in the aforesaid appropriate range are Fe-Cr alloys, Fe-Ni alloys and Fe-Ni-Cr alloys. However, from the viewpoint of economical effect, chrome steels containing 10 to 30% chromium, typically, 10 and several % chromium, are suitable.

The thermal expansion coefficients $\alpha_s$ of such chrome steels are in the range of $10.5\times10^{-6}$ to $11.5\times10^{-6}$/° C., and the strains $\epsilon_y$ at the yield points of the same are 0.001. Ni(52%)-Fe alloy has $\alpha_s$ in the range of $10.4\times10^{-6}$ to $10.8\times10^{-6}$/° C., and $\epsilon_y$ of 0.001. Ni(42%)-Cr(6%)-Fe alloy has $\alpha_s$ in the range of $10.5\times10^{-6}$ to $11.1\times10^{-6}$/° C. and $\epsilon_y$ of 0.001. The unit of content expressed by y "%" is percent by weight.

DESCRIPTION OF THE PREFERRED EMBODIMENTS

An implosion-protected cathode-ray tube in an embodiment according to the present invention will be described with reference to FIG. 1.

A bulb 3 is formed by sealing a glass panel portion 1 provided with a phosphor screen on the inner surface thereof to a funnel portion 2 with a low-melting point glass. A neck portion 4 is formed integrally with the funnel portion 2. A glass stem 6 holding an electron gun structure 5 is inserted into the neck portion 4, and then the glass stem 6 is welded and sealed to the extremity of the neck portion 4. Then, a non-inflammable buffer member 7, such as a glass cloth tape, is wound round the skirt of the panel portion 1 or all round the junction of the panel portion 1 and the funnel portion 2, sealed with the low-melting point glass. Since it is difficult to maintain the state of the wound non-inflammable buffer member without an auxiliary member, the non-inflammble buffer member 7 is held in place with an auxiliary member coated with an adhesive. Since the adhesive contaminates the interior of the evacuating furnace heated at a high temperature and the bulb 3 when the adhesive burnt in the evacuating furnace, the auxiliary member is removed before the heating and evacuating process. In this embodiment, the auxiliary member coated with an adhesive is an adhesive tape. The adhesive tape is wound on and stuck to the front periphery portion of the bulb and the edge (front edge in the present embodiment) of the non-inflammable buffer member 7 so as to overlap the non-inflammable buffer member 7 by a width of about 5 mm. A metallic band 8 is then put on the bulb 3 over the non-inflammable buffer member 7 so that the metallic band 8 may not overlap the adhesive tape. After putting the metallic band 8 on the bulb 3 in shrinkage fit, only the adhesive tape is removed. The metallic band 8 is formed beforehand by welding the opposite ends of a metal strip in a frame having a shape and size respectively corresponding to those of the bulb portion on which the metallic band 8 is mounted. The metallic band 8 having the shape of such a frame is heated for expansion, the expanded metallic band 8 is put on the non-inflammable buffer member 7, and then the metallic band 8 is shrunk by cooling. Then, the bulb 3 is subjected to the heating and evacuation process.

The size of the metallic band 8 is based on the size of the outer peripheral portion of the bulb on which the thickness of the non-inflammable buffer member 7 is added. However, as stated above, the thickness of the non-inflammable buffer member 7 may be neglected in determining the inner perimeter of the metallic band 8.

The composition of the glass forming the bulb 3 is dependent on the type of the corresponding cathode-ray tube, and the portions of the bulb 3. The panel portion 1 of the bulb 3 in an exemplary embodiment, as intended for use for forming a cathode-ray tube for a display, was formed principally of a conventional glass 8% BaO-10% SrO-1% $ZrO_2$-$SiO_2$. The thermal expansion coefficient $\alpha_g$ of this glass was $10.4\times10^{-6}$/° C. The value of the perimeter $L_B$ of the front outer peripheral portion of the bulb 3 is dependent on the type and size of the corresponding cathode-ray tube. The perimeter $L_B$ Of the front outer peripheral portion of the bulb 3 for a cathode-ray tube of 20 in. nominal size was 1456.2±1.8 mm.

The metallic band 8 was formed of a Cr(18%)-Fe alloy, and had a thermal expansion coefficient us of $11.0\times10^{-6}$/° C., a strain $\epsilon_y$ at the yield point of 0.001, an inner perimeter $L_i$ of $1450.8_{-1}^{+0}$ mm (in the case of a cathode-ray tube of 20 in. nominal size for a display), and a thickness of 1.0 mm.

The thickness of the non-inflammable buffer member 7, i.e., the glass cloth tape, was 0.08 mm.

The temperature for shrinkage fit was, 550° C., and hence the temperature differential $\delta t'$ for shrinkage fit 525° C., when the ambient temperature was 25° C.

The evacuation is conducted employing a discharge tube 9 inserted through the glass stem 6 into the bulb 3. The discharge tube 9 is chipped off to seal the bulb 3 hermetically after the completion of heating and evacuation. The bulb 3 is heated at 400° C. (the temperature differential $\delta t$ is 375° C. when the ambient temperature is 25° C.) in a heating furnace for evacuation and it is evacuated. The bulb 3 is taken out from the heating furnace after the completion of heating and evacuation.

The metallic band 8 is formed so that the metallic band 8 is strained beyond the strain at the yield point and a tensile stress corresponding to the yield point remains therein when the metallic band 8 is cooled to the ambient temperature after shrinkage fit. Although the metallic band is heated at a temperature of about 400° C. for heating and evacuation, the metallic band 8 is not subject to a tensile stress exceeding the yield point and hence the metallic band 8 maintains its tightening effect after the heating and evacuation process, because the thermal expansion coefficient of the metallic band 8 is equal to or greater than that of the glass forming the bulb 3. Although the metallic band 8 expands during the heating and evacuation process, the metallic band 8 maintains its tightening effect to prevent the implosion of the bulb 3 during the heating and evacuation process, because the value of $\alpha_s$ is determined selectively so that the perimeter $L(1+\alpha_s\cdot\delta t)$ of the metallic band 8 during the heating and evacuation process is smaller than that of the bulb 3.

In this embodiment, the metallic band 8 was shrunk on the outer peripheral portion of the bulb after sealing the electron gun structure 5 to the bulb 3, however, the metallic band 8 may be shrunk thereon before sealing the electron gun structure 5 to the bulb 3. In this embodiment, the metallic band 8 is shrunk on the outer peripheral portion of the bulb after sealing the panel portion 1 to the funnel portion 2 with the low-melting point glass, however, when necessary, the the metallic band 8 may be shrunk on the outer peripheral portion of the bulb before sealing the panel portion 1 to the funnel portion 2 with the low-melting point glass.

As described above, according to the present invention, an implosion-preventive metallic band formed of a material having an appropriate thermal expansion coefficient is shrunk on the front outer peripheral portion of a bulb for a cathode-ray tube to suppress the occurrence of accidental implosion of the bulb during the heating and evacuation process and the subsequent rapid cooling process, regardless of some dimensional variations in the associated members.

What is claimed is:

1. An implosion-protected cathode-ray tube provided with an implosion-preventive metallic band shrunk on a front outer peripheral portion near the face of a bulb thereof, characterized in that the metallic band is formed of a material having a thermal expansion coefficient $\alpha_g$ which is not less than a thermal expansion coefficient $\alpha_g$ of a material forming the bulb, which metallic band material is selected such that a value expressed by $L(1+\alpha_g\,\delta t)$ is smaller than the perimeter of the front outer peripheral portion of the bulb on which the metallic band is shrunk during a heating and evacuation process, where L is the inner perimeter of the metallic band at the ambient temperature when the metallic band shrunk on the bulb is removed from the bulb, and where $\delta t$ is a temperature differential between the ambient temperature and a temperature for said heating and evacuation process.

2. An implosion-protected cathode-ray tube according to claim 1, wherein a non-inflammable buffer member is wound around the front outer peripheral portion of the bulb, and then the metallic band is shrunk over said buffer member on the front outer peripheral portion of the bulb by shrinkage fit so that a stress corresponding to a yield point of the material of the metallic band remains in the metallic band at the ambient temperature.

3. An implosion-protected cathode-ray tube according to claim 1, wherein a tensile stress corresponding to a yield point of the material of the metallic band remains in the metallic band at the ambient temperature.

* * * * *